US007557715B1

(12) United States Patent
Noakes et al.

(10) Patent No.: US 7,557,715 B1
(45) Date of Patent: Jul. 7, 2009

(54) DESTRUCTIBLE RFID TRANSPONDER

(75) Inventors: Scott H. Noakes, Albuquerque, NM (US); Charles A. Johnson, Albuquerque, NM (US); Matthew K. Burnett, Albuquerque, NM (US); Robert W. Tiernay, Albuquerque, NM (US)

(73) Assignee: TC License Ltd., Hummelstown, PA (US)

( * ) Notice: Subject to any disclaimer, the term of this patent is extended or adjusted under 35 U.S.C. 154(b) by 306 days.

(21) Appl. No.: 11/349,093

(22) Filed: Feb. 8, 2006

(51) Int. Cl.
*G08B 13/14* (2006.01)
(52) U.S. Cl. ................................ 340/572.8; 340/572.1
(58) Field of Classification Search ............... 340/572.8
See application file for complete search history.

(56) References Cited

U.S. PATENT DOCUMENTS

| | | | |
|---|---|---|---|
| 5,528,222 A | 6/1996 | Moskowitz et al. | |
| 5,682,143 A | 10/1997 | Brady et al. | |
| 5,786,626 A | 7/1998 | Brady et al. | |
| 5,826,328 A | 10/1998 | Brady et al. | |
| 5,972,176 A | 10/1999 | Kirk et al. | |
| 6,028,564 A | 2/2000 | Duan et al. | |
| 6,078,259 A | 6/2000 | Brady et al. | |
| 6,097,347 A | 8/2000 | Duan et al. | |
| 6,114,962 A * | 9/2000 | Wiklof et al. | 340/575.8 |
| 6,121,880 A | 9/2000 | Scott et al. | |
| 6,140,146 A | 10/2000 | Brady et al. | |
| 6,215,402 B1 | 4/2001 | Rao Kodukula et al. | |
| 6,259,408 B1 | 7/2001 | Brady et al. | |
| 6,275,157 B1 | 8/2001 | Mays et al. | |
| 6,794,000 B2 * | 9/2004 | Adams et al. | 428/40.1 |
| 7,049,962 B2 * | 5/2006 | Atherton et al. | 340/572.1 |
| 7,102,520 B2 * | 9/2006 | Liu et al. | 340/572.1 |
| 7,102,522 B2 * | 9/2006 | Kuhns | 340/572.7 |
| 7,277,017 B2 * | 10/2007 | Baba et al. | 340/572.7 |
| 7,301,462 B1 * | 11/2007 | Holling et al. | 340/572.8 |
| 2002/0135481 A1 * | 9/2002 | Conwell et al. | 340/572.1 |
| 2005/0174240 A1 * | 8/2005 | Vogt | 340/572.8 |
| 2006/0071816 A1 * | 4/2006 | Tang et al. | 340/928 |

* cited by examiner

*Primary Examiner*—Toan N Pham
*Assistant Examiner*—Kerri L McNally
(74) *Attorney, Agent, or Firm*—Caesar, Rivise, Bernstein, Cohen & Pokotilow, Ltd.

(57) ABSTRACT

A tamper resistant electronic tag that wirelessly receives and transmits unique subscriber information to and from a transceiver so that financial transactions can occur quickly and seamlessly. In a preferred embodiment, the tag works in conjunction with a roadway toll booth and is mounted onto a flat interior surface of a vehicle, where it can receive and transmit electronic information to and from a toll booth. That allows a driver to pay the toll fee without having to stop his vehicle. The electronic tag includes a plastic protective card for carrying a circuit. The circuit includes an integrated circuit that is adhesively attached to the protective card. The protective card and circuit are then attached to the flat surface. When the protective card is removed, the integrated circuit is pulled off with the protective card while the rest of the circuit remains attached to the flat surface, thereby severing the circuit, and rendering it inoperable. This prevents the unwanted tampering and unauthorized use of the electronic tag.

29 Claims, 7 Drawing Sheets

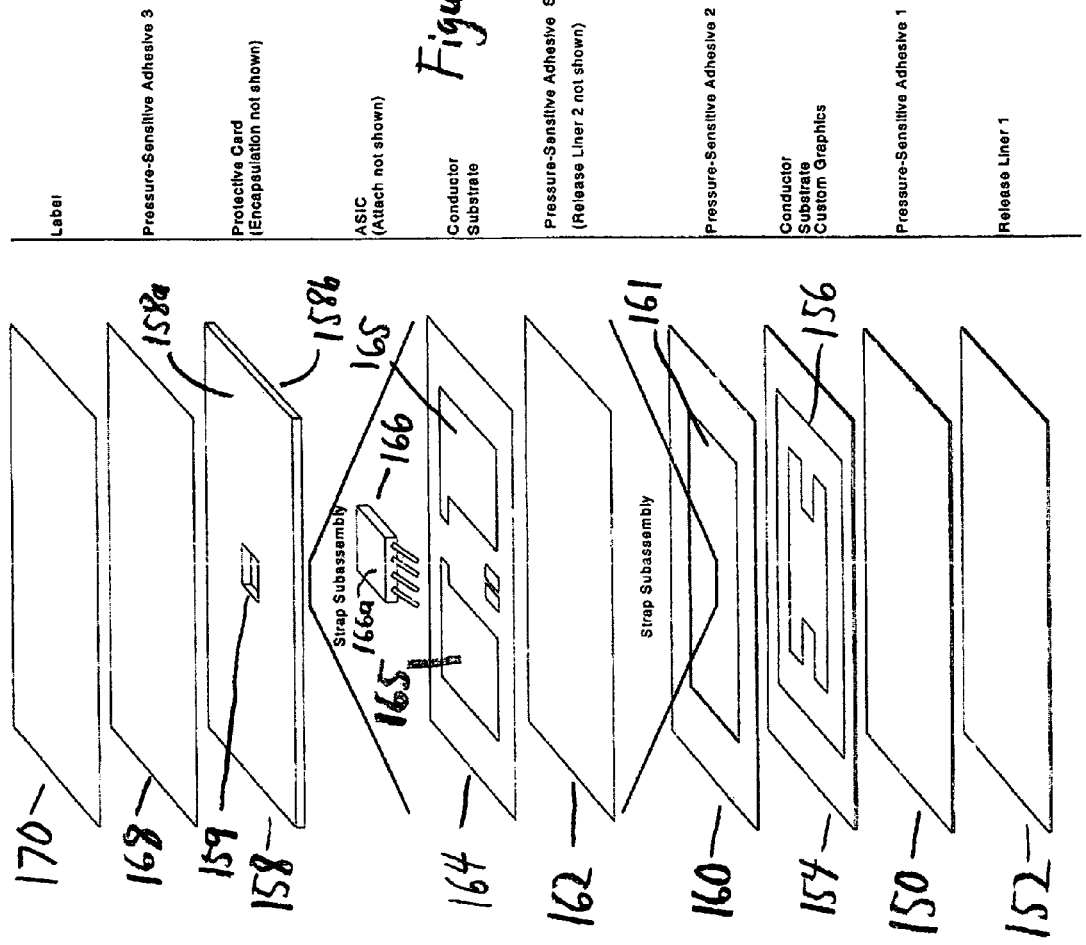

DESTRUCTIBLE RFID TRANSPONDER

FIELD OF INVENTION

The present invention is directed to a tamper resistant electronic tag that attaches to the inside of an automobile, preferably the front windshield, so that unauthorized removal of the tag will render the tag inoperable. The tag is preferably part of a highway toll collection system that allows a vehicle to automatically pay toll fees, by transmitting a signal incorporating unique subscriber information to a transceiver at a toll booth so that the vehicle may pass through the toll booth without having to stop the vehicle. The tag may also be used for other RF-identification applications, such as in parking facilities, vehicle registration and retail stores. Additionally, the tag may provide RF-identification for security and access control applications.

BACKGROUND OF THE INVENTION

Use of toll booths for collecting fees along heavily trafficked highways and roadways is a common practice for generating revenue for many jurisdictions. In order to facilitate the quick and efficient collection of these fees and to prevent "bottlenecking" at the toll booths, many jurisdictions have incorporated wireless electronic tags that seamlessly transmit subscriber information to a transceiver at the toll booth, which then automatically deducts the appropriate fees from an existing account established by the tag owner. In that way, a driver may simply pass a toll booth and have the appropriate fees paid without having to bring his vehicle to a stop.

The electronic tags are typically small portable units that are placed inside a vehicle so that when a toll booth is passed, the tag retransmits signals to a transceiver at a toll booth. Oftentimes, the tags are attached to a front windshield of a vehicle so that its signal to the toll booth is unobstructed. However, this often leaves the tag in open view making it highly susceptible to theft.

One solution to this problem is to embed the electronic tag in between two layers of glass in a vehicle's windshield, as disclosed in U.S. Pat. No. 6,275,157 to Mays et al. This prevents unwanted tampering, but also bars access to the tag. If the tag malfunctions or otherwise becomes inoperative, or if the vehicle is sold, it is impossible to access the tag without destroying the windshield. It would also be advantageous to provide an electronic tag that can be accessed without having to destroy or break portions of the vehicle.

SUMMARY AND OBJECTS OF THE INVENTION

It is an object of the present invention to provide an electronic tag that transmits subscriber information to allow quick and efficient financial transactions to occur. It is a further object of the present invention to provide a tag that can be attached to a surface, particularly a vehicle's windshield, to prevent unauthorized tampering with the tag. It is still a further object of the present invention to provide an electronic tag that will become inoperable when tampered with.

The present invention is directed to a tamper resistant electronic tag that wirelessly retransmits subscriber information to a transceiver when interrogated, so that financial transactions can occur quickly and seamlessly. A preferred embodiment mounts the tag onto a relatively flat surface, typically the front windshield of a vehicle, where it receives an interrogation signal from a "reader" system and retransmits a modified signal carrying subscriber information back to the reader system.

The tag may include a card like structure that prevents access to the internal structures of the tag. This protective card is generally flat, rectangular shaped laminate with a hole therein for holding the integrated circuit. The integrated circuit is encapsulated or affixed in the hole, causing it to be securely held within the hole and further making it difficult to remove the integrated circuit from the card without causing it to become inoperable.

It is another object of the invention to provide a multi-layered tag with an easily damaged substrate that will become inoperable upon removal or attempted removal. The strength of adhesion between the various layers and components of the tag is controlled to allow the circuit to be easily and permanently separated from the tag's receiving antenna and capacitive coupling element upon removal of the tag.

The tag is meant to be easily destructible upon tampering or attempted removal from a surface. However, the tag is also meant to be durable for its intended use. The tag is designed to give reliable and long lasting use up until the point at which it is tampered with or removed.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 2 is an exploded view of an embodiment of the electronic tag comprising multiple layers;

DETAILED DESCRIPTION OF THE INVENTION

Figure 1:
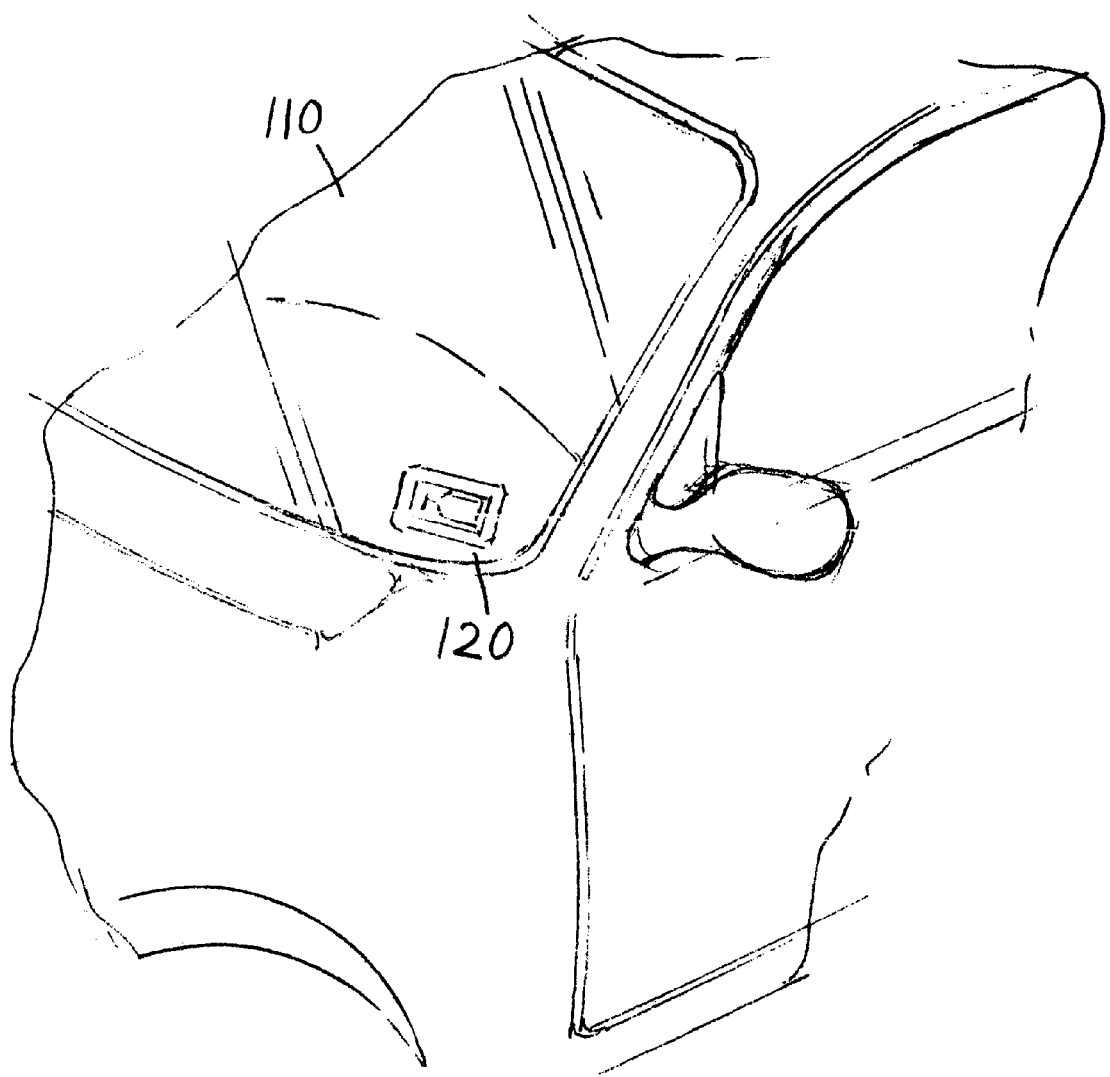
FIG. 1 is a perspective view drawing of an electronic tag of the present invention attached to a windshield of a vehicle.

Referring now in detail to the drawings, FIG. 1 shows an electronic tag 120 of the present invention mounted on the inside of a vehicle's front windshield 110. The tag 120 can be mounted anywhere inside the vehicle, but the front windshield 110 provides a preferred location because it permits a clear and unobstructed path for signals to be sent between the tag 120 and a data processing station (not shown). In addition to being mounted onto the windshield 110, the tag 120 may be embedded into the windshield of new cars.

In a preferred embodiment of the invention, the tag 120 is used in conjunction with roadway toll booths, so that subscribed information can be relayed to the toll booth and the proper fee electronically paid without having to stop the vehicle. However it is also envisioned that the tag 120 be used in a variety of other environments to eliminate cash transactions, thereby increasing the speed and efficiency at which these financial transactions can occur. For example, it is contemplated that the tags be used in conjunction with fast food drive-throughs, gas stations, parking facilities, or any other location where cash is exchanged. Additionally, the tag is not limited to the transfer of electronic financial information, but can be used to transfer any information which needs to be quickly and accurately relayed. The tag 120 also provides a level of security for these transactions by limiting the access to the tag 120, thereby preventing their fraudulent use.

FIG. 2 shows an embodiment of the invention in which multiple layers are employed to make a thin electronic tag 120 with low manufacturing costs. In this embodiment, the electronic tag consists of a first pressure sensitive adhesive layer (PSA) 150 which allows the tag to be affixed to the windshield of the vehicle. During manufacture of the tag, the first PSA 150 is covered with a release liner 152, that must be removed in order to expose the adhesive. The first PSA 150 is attached to a substrate 154 that allows for the printing of custom graphics on the face of the substrate that faces the windshield. On the opposite face of the substrate 154 is an antenna 156 that receives an interrogation signal from a toll booth reader/transceiver.

The substrate 154 is attached to the protective card 158 by the second PSA 160, which, preferably, is annular in shape and has a center opening 161. The strap subassembly (SS) is affixed between the substrate 154 and protective card 158. The SS consists of strap subassembly PSA (SSPSA) 162, a SS substrate 164 bearing a SS capacitive coupling element 165, and an integrated circuit 166. Collectively, the antenna 156, SSPSA 162, SS substrate and SS capacitive element 165 form the coupling circuitry of the tag, with the SSPSA 162 and the SS substrate 164 acting together as a dielectric.

Optionally, the SSPSA 162 is covered with a release liner (not shown) to protect the adhesive until the SS is assembled into the tag. In the embodiment shown in FIG. 2, the components of the strap subassembly fit within the opening 161 of the second PSA layer 160.

Figure 3A:
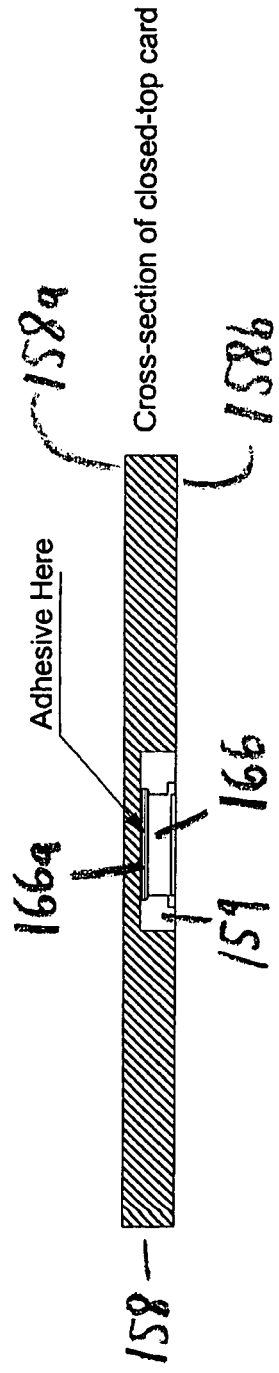
FIG. 3a is a cross section view of an embodiment of a protective card of the invention with a closed-top hole for receiving the integrated circuit.

The protective card 158, is punched with a hole 159, in which the integrated circuit 166 fits. A preferred embodiment of the protective card 158 containing a hole 159 that does not go all the way through the card, is shown in FIG. 3a. In the embodiment of FIG. 3a, the outer surface of integrated circuit 166a is attached with an adhesive (not shown) to the protective card. This adhesive can be of any type suitable for use with the integrated circuit 166. Preferably, the adhesive will have properties that make the adhesion between the integrated circuit 166 to the protective card 158 stronger than the adhesion between the integrated circuit 166 and the SS substrate 164. The adhesive will be sufficiently strong to make it difficult to remove the integrated circuit 166 from the protective card 158 without damaging the integrated circuit.

Figure 3B:
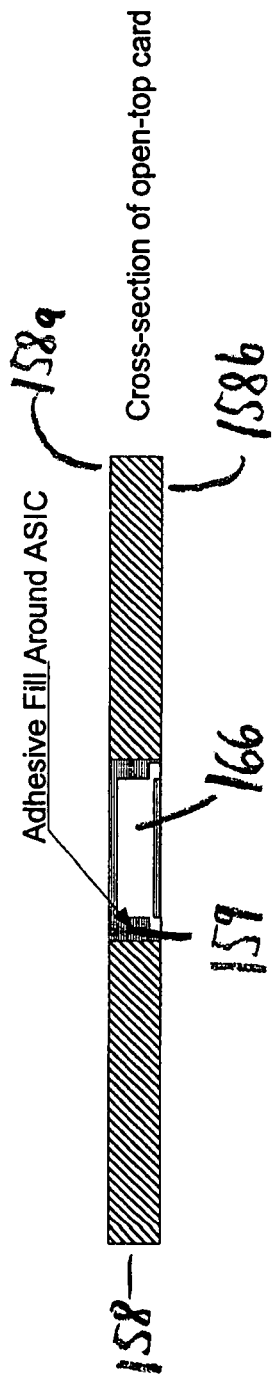
FIG. 3b is a cross section view of an embodiment of a protective card of the invention with a open-top hole for receiving the integrated circuit.

A further embodiment of the protective card 158 with a hole 159 that goes all the way through the card is shown in FIG. 3b. In the embodiment of FIG. 3b, the integrated circuit 166 is secured to the support card 158 by filling the empty space of the hole with a fill material such as an adhesive. This fill material can be of any type suitable for use with the integrated circuit 166. Preferably, the fill material will have properties that make the adhesion between the integrated circuit 166 to the protective card 158 stronger than the adhesion between the integrated circuit and the SS substrate 164. The fill material should also preferably be sufficiently strong to make it difficult to remove the integrated circuit 166 from the protective card 158 without damaging the integrated circuit. The integrated circuit 166 is fixed within the protective card so that the outer surface of the integrated circuit 166a does not protrude beyond the outer surface 158a of the protective card 158. In an embodiment where there is fill material present on the outer surface 166a of the integrated circuit, the level of the fill material does not protrude beyond the outer surface 158a of the protective card 158. Further, the thickness of the second PSA 160 in combination with the thickness of the protective card 158 will also be sufficient to ensure that the outer surface of the integrated circuit 166a does not protrude beyond the outer surface of the protective card 158a. Accordingly, a flush surface is presented for application of the optional label 170. As shown in FIG. 2, the outer layer 158a of the protective card 158 is optionally covered with a third PSA 168 to which an optional label 170 may be affixed.

If someone tries to remove the integrated circuit 166 for illicit purposes, they must remove it from the protective card 158. However, this process would result in the integrated circuit 166 (which is susceptible to mechanical damage or electrostatic discharge) being rendered inoperable.

Tamper resistance of the tag embodied in FIG. 2 is achieved through the use of destructable substrates, by varying the adhesion between the various layers and components, and by preventing access to internal structures. Examples of certain features of the tag of the invention are described in detail below. The features described below are merely illustrative and are not intended to be limiting, and it should be apparent to one of skill in the art that there are further features of the tag which fall within the scope and spirit of the invention.

In a preferred embodiment, the release liner 152 covering the first PSA 150 is made of polyethylene terephthalate (PET). Further, the release liner 152 may be transparent, allowing for inspection of the optional customer graphics on the substrate 154. In one embodiment of the invention, the release liner 152 is printed with the words "Remove this Liner," or other similar instructions to facilitate end-use installation.

The two sides of the first PSA 150 have different adhesive properties that make the adhesion of the substrate 154 to the windshield 110 stronger than that adhesion of the substrate 154 to the protective card. This difference in adhesion between varying surfaces is important for the tamper resistance of the tag. Further, it is desirable that the first PSA 150 be optically clear, so that any graphics printed on the substrate 154 are visible through it. Ideally, the first PSA 150 is also resistant to discoloration or loss of adhesion upon long term exposure to sunlight and heat, as it is this layer that makes contact with the windshield of the automobile. Preferably, the first PSA 150 is an acrylic transfer adhesive, but it could also be any type of adhesive that satisfies the adhesion properties necessary for the tamper resistance of the tag.

It is preferred that the substrate 154 be opaque to be able to obscure the internal parts of the tag from view while further providing a good background for optional customer graphics. As graphics can be printed on the substrate 154, it is desirable that the substrate 154 be white or of a light color to make the graphics easier to see. In a preferred embodiment, graphics, if desired by the customer, may be applied to the substrate 154 by a pad printing process. Further, the material for the substrate 154 may be chosen to allow for the application of the antenna 156 on one of its surfaces.

The substrate 154 can be made from a wide variety of materials, with the destructibility of the substrate 154 being a desirable property. As a non-limiting example, the substrate 154 may be made out of a low melting point material that is easily destroyed upon tampering with the tag, such as polyethylene terephthalate (PET) or polyethylene napthalate (PEN). As a further non-limiting example, the substrate may be made out of paper. Generally, the substrate may be made out of a material that rips, tears or breaks easily, such as a flexible vinyl. Further, the substrate may be of a thickness that causes it to be easily destroyed by tampering.

In a preferred embodiment, the antenna 156 of the invention is printed onto the inside-facing surface of the substrate 154, preferably through a screen printing process. In one embodiment, the antenna 156 is composed of a conductive thermoset ink containing silver. It is also preferred that the antenna 156 have geometric features that increase the likelihood that the antenna 156 will be destroyed if the invention is removed from a windshield. These geometric features may include, reduced surface area of the antenna (such as antennas with an annular shape), specific shapes that concentrate the stresses placed upon the antenna during tampering (such as notches in the edges of the antenna), and/or orientation of the antenna so that the stresses placed upon the antenna occur across areas of shorter geometry (i.e. the antenna is oriented so that the stresses occur across the antenna in the direction of its smallest dimension). It is also preferred that the antenna 156 have an aperture-based design that is optimized for use with the integrated circuit 166 of the invention. An example of an antenna that can be used in the invention is described in U.S. patent application "RFID Tag With Small Aperture Antenna," Ser. No. 11/121,140, which is hereby incorporated by reference herein.

The second PSA 160 preferably consists of acrylic double-coated tape. As will be discussed below, it is important that the second PSA 160 have adhesive properties that make substrate-to-protective card adhesion weaker than the substrate-to-windshield adhesion caused by the first PSA 150. It is also preferred that the second PSA 160 have an annular shape to facilitate tag destruction by reducing the adhesive surface area between the substrate 154 and the second PSA 160 and between the second PSA 160 and the protective card 158. As mentioned, the second PSA layer 160 should be thick enough so that the outer surface of the integrated circuit 166a does not protrude past the outer surface 158a of the protective card 158.

Turning to the strap subassembly (SS) part of the invention, it is preferred that the SS substrate 164 is made of polyimide. Preferably, the SS substrate 164 serves to not only accept the integrated circuit 166 and coupling circuitry, but also serves as one part of the dielectric of the circuitry coupling the antenna 156 to the SS capacitive coupling element 165. Further, the SS substrate 164 may have destructibility properties similar to those of the substrate 154. The SS substrate 164 should be as thin as possible, without detracting from the function of the tag.

The strap subassembly PSA (SSPSA) 162 is preferably made of an acrylic transfer adhesive. The SSPSA 162 serves to not only attach the SS securely to the antenna 156, but also serves as the second part of the dielectric of the circuitry coupling the antenna 156 to the SS capacitive coupling element 165. It is preferable that the SSSPSA 162 adhere the antenna 156 to the SS substrate 164 with enough strength so that the bond between the integrated circuit 166 and the SS capacitive coupling element 165 will fail before the bond between the antenna 156 and the SS substrate 164 fails. Preferably, the SSPSA 162 is an acrylic transfer adhesive, but it could also be any type of adhesive that satisfies the adhesion properties necessary for the tamper resistance of the tag.

The SS capacitive coupling element 165 of the invention serves at least two purposes. First, it carries electrical signals between the integrated circuit 166 and the coupling circuitry, and second, it comprises one side of the coupling circuitry. In a preferred embodiment, the SS capacitive coupling element 165 is made of copper and is patterned in a subtractive etching process. The SS capacitive coupling element 165 may also have a coating to prevent corrosion and to facilitate reflow solder processing. It should be appreciated that the integrated circuit 166 may also be non-capacitively coupled to the antenna 156 with a connection that is mechanically weak to satisfy the tamper resistant properties of the tag.

The integrated circuit 166 of the present invention is attached to the SS in a manner that gives the attachment a minimal mechanical strength needed to operate under normal conditions. Because of this, the circuit 166 is more likely to become separated from the coupling circuitry if an attempt is made to remove the tag 120. In a preferred embodiment, the integrated circuit 166 is attached with a lead-free solder, and only the Input and Ground pins of the circuit are soldered to the SS capacitive coupling element 165. It is contemplated that the integrated circuit 166 can be attached by the soldering of additional pins to the SS capacitive coupling element. Further, the use of other attachment means, such as conductive epoxies, are also contemplated by the invention. It is preferred that the integrated circuit 166 be attached to the SS capacitive coupling element 165 in the weakest manner possible that does not interfere with the reliability of the tag for normal everyday use.

A primary purpose of the protective card 158 of the invention is to prevent the removal of the tag 120 for unauthorized uses. This is preferably done by preventing access to the first PSA 150. In a preferred embodiment, the protective card 158 is made of polycarbonate, but it may also be made of other plastics or materials. In one embodiment, the protective card 158 is white in color, although other colors are contemplated by the invention. It is important that the protective card 158 be of a significant thickness to reduce access to the first PSA 150. Preferably, the protective card 158 is about 0.04 inches thick, but could be thicker or thinner depending on the other components of the tag. It is also preferable that, after application, the protective card 158 is separated from the windshield by approximately 0.004 inches. This separation can be varied by varying the thickness of the first PSA 150 and the substrate 154. Although greater separation from the windshield is contemplated by the invention, separation of 0.004 inches or less is ideal for preserving the tamper resistant features of the tag.

The differences in the adhesion properties between different layers of the tag may be further enhanced by varying the surfaces of the protective card 158. In a preferred embodiment, the outer surface 158a of the protective card 158 is smooth, while the inner surface 158b is rough. The rough inner surface 158b of the protective card 158 reduces the surface area of contact between the protective card 158 and the second PSA 160, further enhancing the destructibility of the tag. As a non-limiting example, the inner surface 158b of the protective card 158 may be made with a stippled surface during the molding of the card. It should be apparent that other variations in the surface of the protective card 158 that change its adhesion properties are also contemplated by the invention.

The optional label 170 conceals the internal features of the tag while also providing a surface for the optional display of graphics and/or information identifying the tag. The label 170 may be made of PET. Ideally, the label 170 is purchased with customer specific graphics already printed on it, and can easily be dispensed from a roll for application during manufacturing of the tag. During the manufacturing process, the identification information specific to that tag may be printed on the label 170, such as an identification number. As the label 170 is likely purchased, the third PSA 168 will typically be pre-applied to the label 170.

The embodiment of the tag shown in FIG. 2 operates in the following manner. An interrogator, such as from a toll booth reader/transceiver, transmits an interrogation signal to the tag. The antenna 156 converts the electromagnetic energy into alternating currents. The antenna 156 is capacitively coupled to the integrated circuit 166, with the SSPSA 162 and SS substrate 164 acting as a dielectric. This entire capacitive coupling forms the circuit of the invention. The alternating current on the antenna 156 side of the circuit results in time-varying electromagnetic (EM) fields appearing across the circuit. The EM fields induce an alternating current on the integrated circuit 166 side of the circuit. The alternating current is then rectified by the integrated circuit 166. The integrated circuit 166 detects that modulation is absent from the signal and begins to modulate the intrinsic impedance of the antenna 156. This results in a modulated backscatter from the tag that is detected by the interrogator and processed. In a preferred embodiment, the tag in powered by energy conveyed in the interrogation signal. However, separate power sources, such as a battery or solar cell, are also contemplated by the invention.

The tamper resistance of the embodiment of the tag of FIG. 2 will now be described. In one scenario, an attempt is made to remove the tag using only the fingers. The tag is thin, fits close to the windshield, and lacks the topographical features necessary for gripping and removing the tag. As such, it becomes necessary to insert the fingernails between the tag and the windshield to begin to peel the tag away.

The first PSA 150 is made up of a strong adhesive, so the tag is securely adhered to the windshield, requiring successive force to peel it away. For example, the first PSA 150 may be made up of an adhesive layer that has a peel adhesion strength to stainless steel of about 1200 N/m. By contrast, the second PSA 160 is made up of a weaker adhesive that, upon tampering, will fail before the first PSA 150. For example, the second PSA 160 may be made up of an adhesive layer that has a peel adhesion strength to stainless steel of about 650 N/m. It should be appreciated that adhesive layers with different peel adhesion strengths are also contemplated by the invention, with the primary concern that the first PSA 150 has a higher peel adhesion strength than the second PSA 160.

Figure 4:
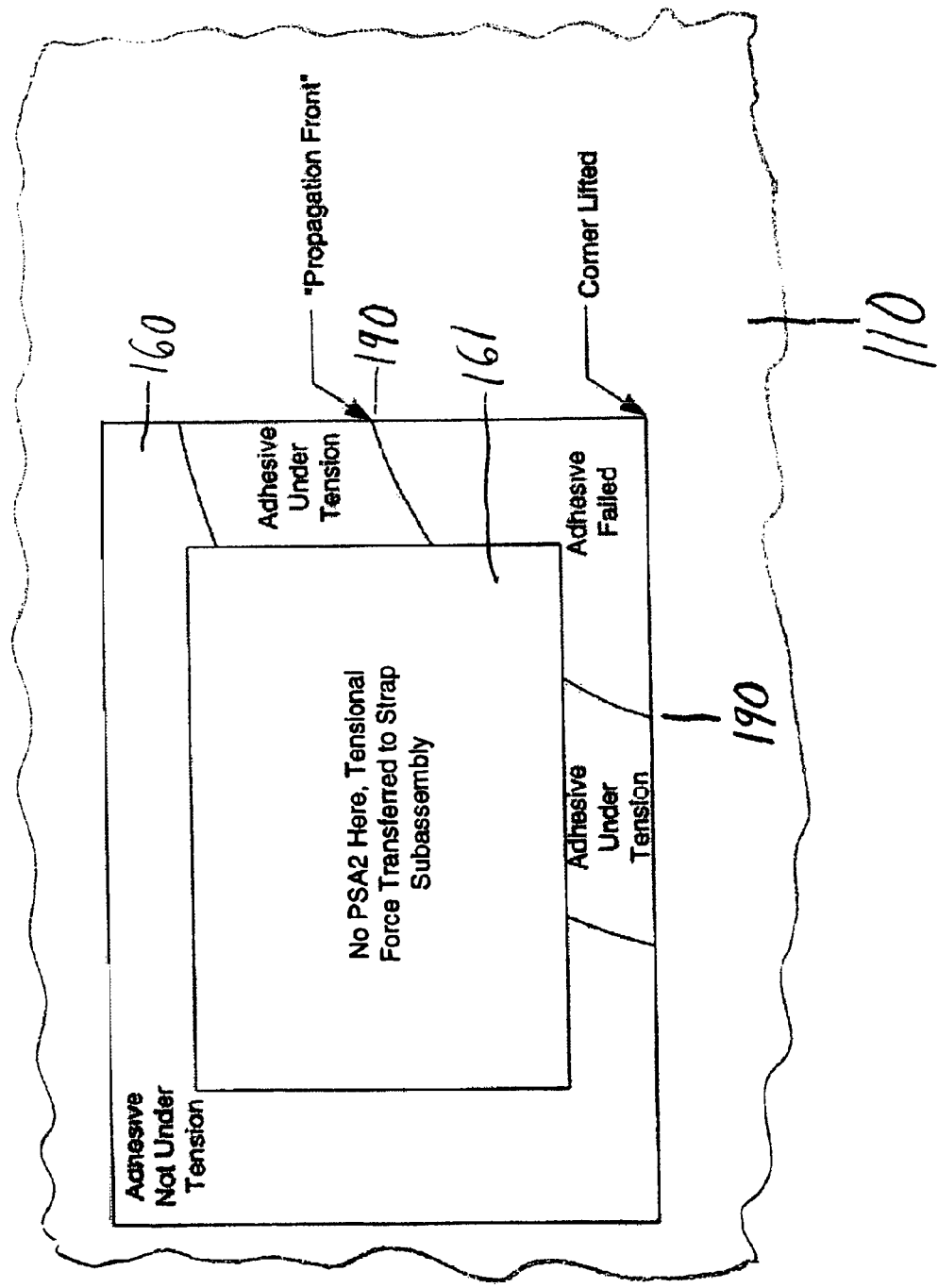
FIG. 4 is a schematic view of the pattern of adhesive failure during an attack on the tag of FIG. 8 by hand.

The protective card 158 is separated from the windshield by the first PSA 150 and the substrate 154 by a distance of approximately 0.004 inches. A fingernail is approximately 0.012 inches thick and is somewhat blunt edged. As such, force applied with a fingernail will not be able to be directed to the first PSA 150, but will instead be directed to the protective card 158. The initial sequence of events that occur during an attack by hand to the bottom right corner of the tag are shown schematically in FIG. 4. Once the wedge force applied by the fingernail exceeds the stiffness of the protective card 158, the protective card 158 will begin to flex locally away from the windshield. As the protective card 158 flexes, the first PSA 150 and second PSA 160 are put in tension. The tension in the first PSA 150 is counterbalanced by its adhesion to the windshield and the substrate 154, while the tension in the second PSA 160 is counterbalanced by its adhesion to the substrate 154 and the protective card 158.

As the person attacking the tag begins to apply a pulling force away from the windshield, the protective card 158 continues to flex and the tension increases in the first PSA 150 and second PSA 160. As diagrammed in FIG. 4, the tension in the second PSA 160 eventually exceeds the adhesive strength between the second PSA 160 and its adjacent layers. At this point, the protective card 158 begins to locally come away from the substrate 154, which remains adhered to the windshield, while a propagation front of adhesive failure 190 (delamination) forms (see FIG. 4). As the pulling force continues, the delamination progresses along the width of the second PSA 160 until the front reaches the center opening 161, when the tensional forces are transferred to the SS. The tension across the SSPSA 162 is balanced with the integrated circuit's 166 attachment to the SS substrate 164 and with the adhesion between the integrated circuit 166, encapsulant for the integrated circuit and the protective card 158.

As the tension across the SSPSA 162 and the integrated circuit 166 attachment increases, one of two things will happen. Most likely, the integrated circuit 166 attachment will fail, leaving the SS capacitive coupling element 165 and SS substrate 164 attached to the windshield while the integrated circuit 166 remains encapsulated in the now separated protective card 158. This is the preferred destruct mode. If the pulling force is released before complete separation of the tag layers, the performance of the tag will be at least severely limited if the protective card 158 is somehow stuck back down to the substrate 154. Once the protective card 158 and integrated circuit 166 are pulled completely away from the substrate 154 and SS, the tag will be rendered inoperable, because the integrated circuit 166 will no longer communicate with the coupling element 165 and the antenna 156. Further, if the protective card 158 and integrated circuit 166 are removed and applied, through whatever means, to the windshield of another automobile, it will be visibly obvious that the tag has been tampered with.

If the IC attachment does not fail, then the SSPSA 162 will begin to fail, resulting in the SS substrate 164 being held to the protective card 158 by the encapsulant and the integrated circuit 166 attachment. When the circuit 166 is pulled away from the antenna 156, this will destroy communication between the two and render the tag inoperable. If the pulling force is released before complete separation and the protective card 158 stuck back down on the substrate 154, the tag will function, at best with limited operability. Once the protective card 158 and the SS are pulled completely away from the substrate 154, the tag will be rendered completely inoperable. Further, if the protective card 158 and the SS are removed and somehow applied, through whatever means, to the windshield of another automobile, it will be visibly obvious that the tag has been tampered with.

If the protective card 158 and the SS 162, 164, 165 are able to be removed together, the circuit may be susceptible to illicit use. Because of this, a preferred embodiment of the invention has an integrated circuit 166 attachment that is much more likely to fail than the SSPSA 162. This makes destruction of the tag through removal of only the protective card 158 and integrated circuit 166 much more probable than the protective card 158 and the SS substrate 164 being removed together.

In another scenario, the embodiment of the tag of FIG. 2 is attacked by an instrument such as a thin razor blade or flexible putty knife. This type of attack is envisioned to be directed at the first PSA 150, as attack of any other layer would result in destruction of the substrate or delamination of the tag.

If the tag were attacked by a razor blade, the following sequence of events would likely occur. If the razor blade is applied at a low angle to the glass it is possible to directly apply force to the first PSA 150, as the razor blade is thinner than the separation between the windshield and protective card 158. Force would be applied to the blade in a direction lateral to the glass, allowing the blade edge to cut the first PSA 150 away from the windshield. As the blade continues into the tag, more of the upper face of the blade makes contact with the first PSA 150. Adhesion between the blade surface and the first PSA 150 exerts a shear stress on the substrate 154, which is supported by the second PSA 160. As the blade continues laterally along the glass past the annular section of the second PSA 160 into the center section 161, the substrate 154 is no longer supported and shear stress caused by the blade coupled through adhesion of the first PSA 150 to the blade causes the substrate 154 and antenna 156 to tear. This damage to the substrate 154 and antenna 156 will render the tag inoperable. Further, the damage to the substrate will likely be extensive enough to make it visibly obvious that the tag has been tampered with if transferred to another vehicle.

From the above descriptions, it should be apparent that variations in the adhesions or attachments of the various layers and components of the tag are what gives the tag its destructibility. Generally, it is important that at least the antenna 156 be attached to a windshield 110 in manner that is stronger than the attachment of the circuit 166 to one part of the coupling circuitry, i.e. stronger than the attachment of the circuit 166 to the coupling element 165 or stronger than the attachment of the circuit to the antenna 156. These attachments can take place directly or through the sequential attachment of several layers. Once the communication between the antenna 156 and the integrated circuit 166 is destroyed, the tag will be rendered inoperable.

Figure 5:
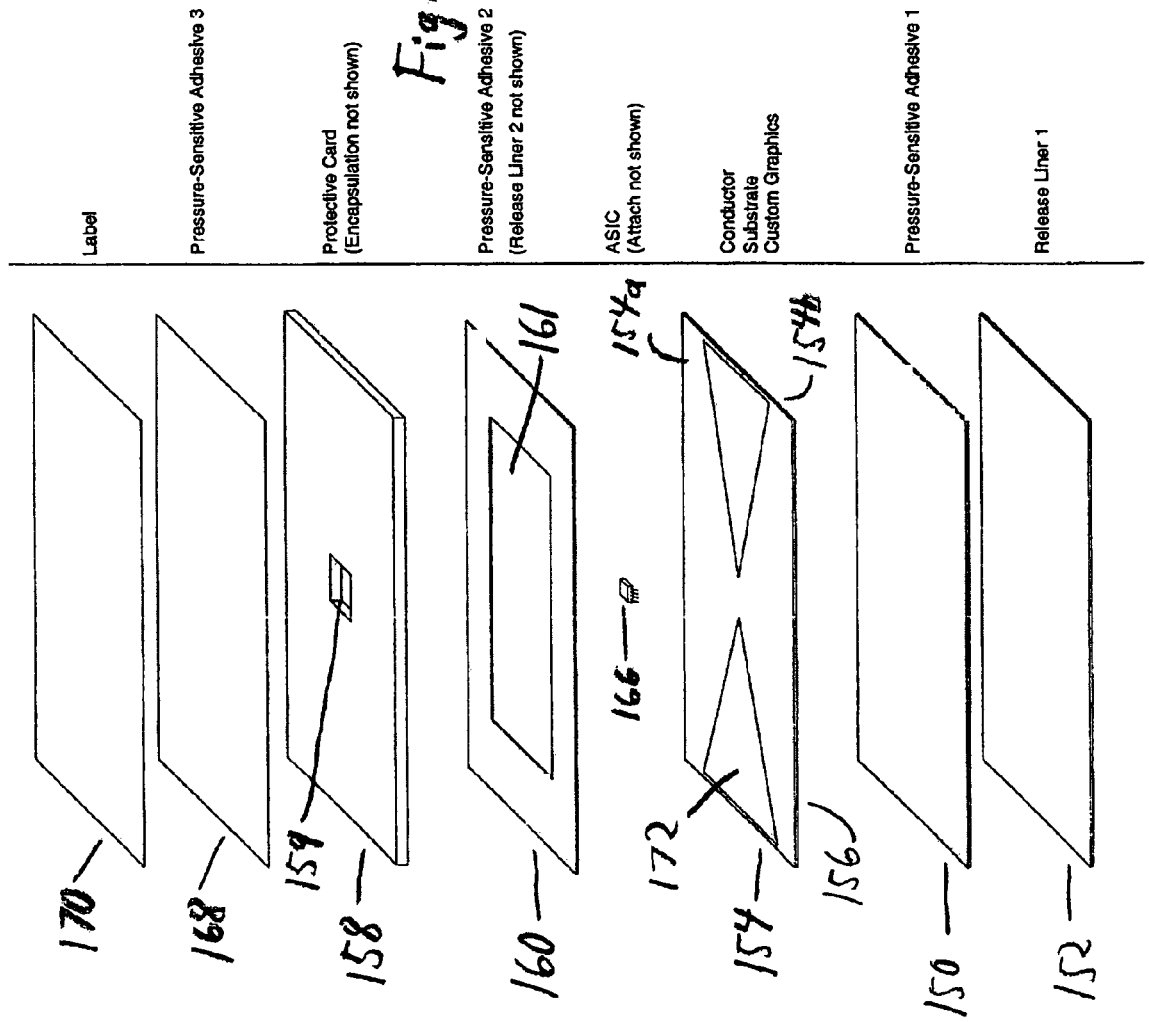
FIG. 5 is an exploded view of an embodiment of the electronic tag comprising multiple layers and lacking a strap subassembly component.

FIG. 5 shows another embodiment of a tag of the invention, in which a SS component is not incorporated. The tag shown in FIG. 5 incorporates many of the same components as the tag shown in FIG. 2. Those components with the same numbers are meant to have the same attributes as already described.

As the embodiment of FIG. 5 does not have a SS, the integrated circuit 166 is directly attached to the substrate 154. Because a preferred embodiment of the antenna 156 of the invention requires capacitive coupling to the integrated circuit 166, the surfaces of the substrate 154 may vary from those described in FIG. 2. In a preferred embodiment, the antenna 156 is applied on the outside surface 154b of the substrate 154, while a capacitive coupling element 172 is applied on the inside surface 154a. In this embodiment, the substrate 154 act as the dielectric in the capacitive coupling.

The circuit attachment of the embodiment of FIG. 5 may be achieved by a variety of methods. The circuit may be attached by soldering, as described above. However, in a preferred embodiment in which a low melting temperature substrate 154 is used, the integrated circuit 166 can alternatively be attached with a conductive epoxy and additional strain relief may be applied to the weak attach points. Further, other methods can be used to attach the integrated circuit 166 to the substrate 154, especially methods that allow for reliable attachment of a controllable strength without the melting of the substrate.

As the antenna 156 is facing outward from the tag in the embodiment of FIG. 5, this embodiment further contemplates an optional ink flood coat. This flood coat can be used to provide a uniform color base for optional customer graphics on the substrate 154 and also can be used to hide the antenna 156 from view.

Upon removal of the tag shown in FIG. 5, the protective card 158 and integrated circuit 166 will be separated from the substrate 154. This will cause the separation of the integrated circuit 166 from the capacitive coupling element 172, destroying communication between the integrated circuit 166 and the antenna 156. This type of destruction is facilitated by the fact that the attachment of the substrate 154 to the windshield 110 is stronger than the attachment of the protective card 158 to the substrate 154.

Figure 6:
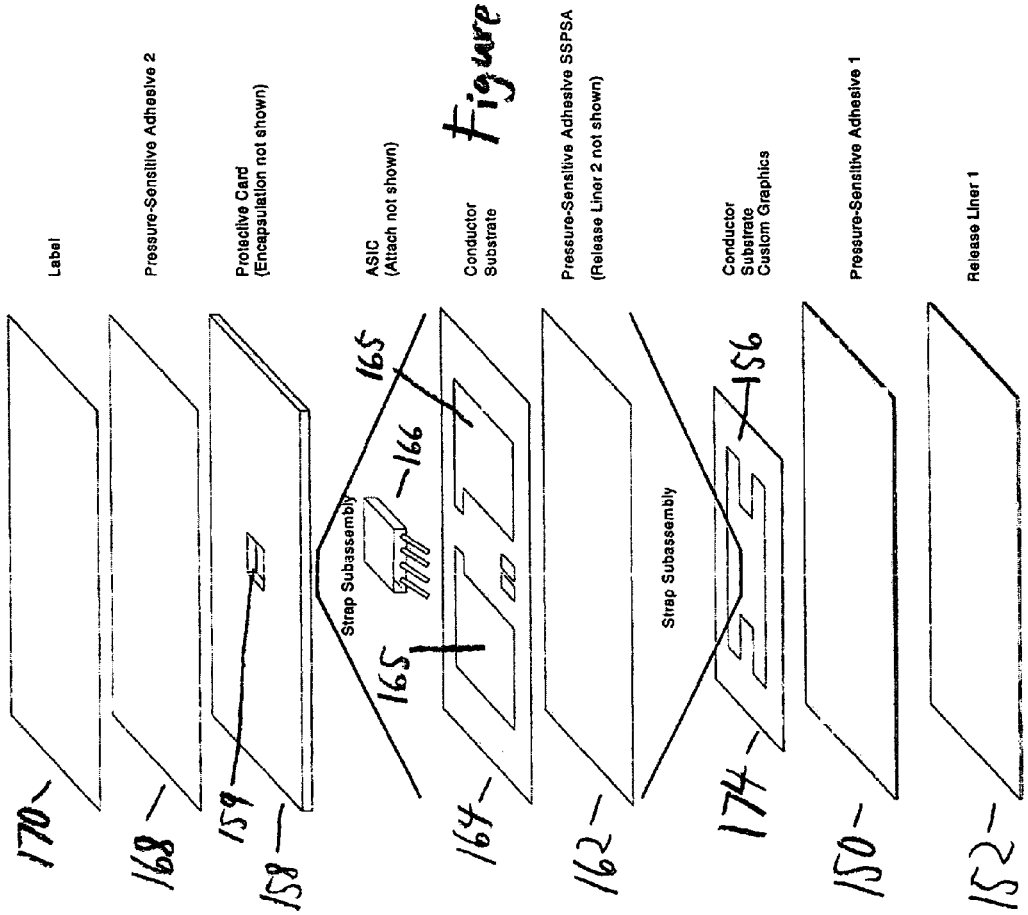
FIG. 6 is an exploded view of an embodiment of the electronic tag comprising multiple layers and including a smaller substrate.

A further embodiment of a tag of the invention is shown in FIG. 6. This embodiment incorporates a smaller substrate 174 to allow for the elimination of the second PSA 160. Eliminating the need to manufacture the annularly shaped second PSA layer further reduces manufacturing costs. The tag shown in FIG. 6 incorporates many of the same components as the tag shown in FIG. 2. Those components with the same numbers are meant to have the same attributes as already described.

The embodiment of FIG. 6 eliminates the need for a second PSA by incorporating a substrate 174 with smaller dimensions than the other components of the tag (with the exception of the components of the SS). Except for its smaller dimensions, the substrate 174 has all of the same attributes as the substrate 154, and most importantly, is highly destructible. The first PSA 150 has the same attributes as described above. However, it is important that the properties of the first PSA 150 and the protective card 158 are such that the substrate to windshield adhesion is stronger than the windshield to protective card adhesion.

It should also be appreciated that the embodiment shown in FIG. 6 can be manufactured without the SS, using the antenna 156 and integrated circuit 166 attachment scheme described in FIG. 5.

The embodiment shown in FIG. 6 will destruct upon removal in a manner analogous to the destruction of the embodiment of FIG. 2. Most likely, the embodiment of FIG. 6 will be rendered inoperable by the separation of the protective card 158 and the integrated circuit 166 from the capacitive coupling element 165. It is also possible that the tag will be rendered inoperable by the separation of the protective card 158, integrated circuit 166 and SS substrate 164 from the substrate 174 and antenna 156.

In a further embodiment, a full sheet second PSA layer may be used to reduce the costs associated with manufacturing an annular second PSA layer. As tamper resistance is partly dependant on the substrate not being supported, it would be possible to add an additional layer to block adhesion of the second PSA to the center of the protective card 158 and or the SS. In a preferred embodiment, this additional layer is made of Teflon, although it could be made of any layer that would prevent adhesion.

Figure 7:
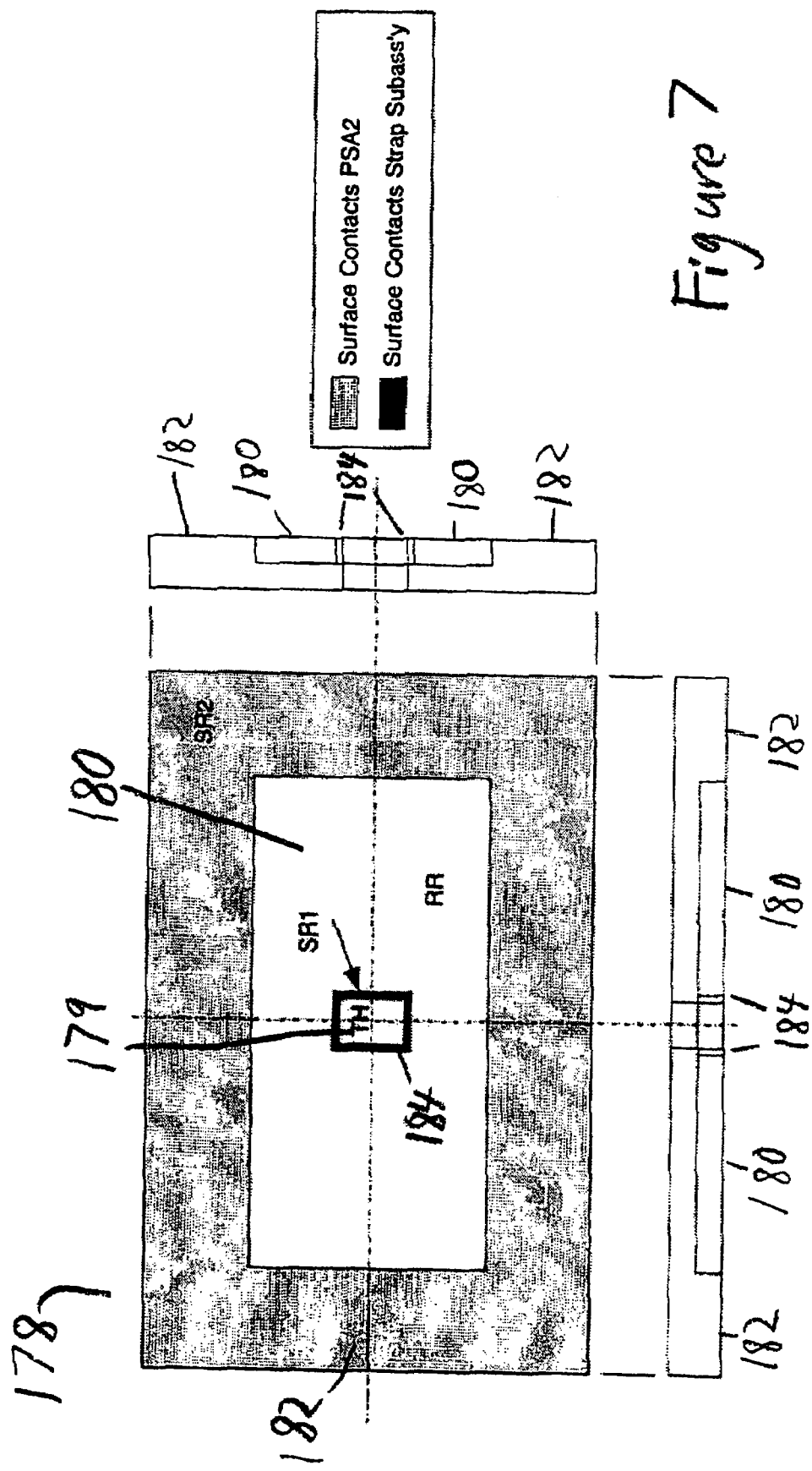
FIG. 7 is a schematic view of a alternate protective card of the invention which eliminates that need for an annularly shaped adhesive layer.

In a still further embodiment, a full sheet second PSA layer may be used with a modified protective card 178 as shown in FIG. 7. The modified protective card 178 also contains a center hole 179 to allow for the encapsulation of the integrated circuit 166. Surrounding this hole is a surface 184 that is able to be contacted with the SS. A central region of the card is recessed 180 so that only the outer annular region of the card 182 makes contact with the second PSA. This type of card could be used, along with a full sheet second PSA, in embodiments similar to those shown in FIGS. 2 and 5.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

The invention claimed is:

1. A tamper resistant electronic tag, comprising:
   a protective card;

an integrated circuit attached to the protective card;
a first substrate layer having a first side and a second side retaining a first electronic element, wherein the first side of the first substrate layer is arranged to be adhered to a surface by a first adhesive layer, and a first portion of the second side of the first substrate layer is adhered to the protective card by a second adhesive layer; and,
a second substrate layer having a first side and a second side retaining a second electronic element operatively coupled to the first electronic element, wherein the first side of the second substrate layer is adhered to a second portion of the second side of the first substrate layer by a third adhesive layer, and the second electronic element is operatively attached to the integrated circuit;
wherein the first adhesive layer is stronger than the second adhesive layer, and the third adhesive layer is stronger than the operative attachment between the integrated circuit and the second electronic element; wherein said first and second electronic elements form a passive circuit component and when, said first substrate layer is attached to said surface by said first adhesive layer, an attempt to remove the tag from said surface results in at least one of: said integrated circuit becoming operatively detached from said second electronic element, or said second substrate layer becoming separated from said first substrate layer so as to damage said operative coupling between said first and second electronic elements, damaging said passive circuit component.

2. The tamper resistant electronic tag of claim 1, wherein when the protective card is removed from the surface, the first and second substrate layers remain with the surface and the integrated circuit is removed with the protective card, thereby severing the operative attachment between the integrated circuit and the second electronic element.

3. The tamper resistant electronic tag of claim 1, wherein the second adhesive layer has an annular shape defining an opening and the second substrate layer fits in the opening of the annular second adhesive layer.

4. The tamper resistant electronic tag of claim 1, wherein:
the protective card has a first side that contains a recess and the integrated circuit is located within the recess.

5. The tamper resistant electronic tag of claim 1, wherein:
the protective card contains a hole and the integrated circuit is located within the hole.

6. The tamper resistant electronic tag of claim 1, wherein:
the first substrate layer is opaque.

7. The tamper resistant electronic tag of claim 1, wherein:
the first side of the first substrate layer comprises a material on which graphics and text can be printed.

8. The tamper resistant electronic tag of claim 1, wherein:
the protective card has a first side and a second side and a label displaying information about the tag is attached to the second side of the protective card.

9. The tamper resistant electronic tag of claim 1, wherein:
the integrated circuit is able to receive and modify a signal to incorporate information into the signal.

10. The tamper resistant electronic tag of claim 1, wherein:
the surface to which the first substrate layer of the electronic tag is arranged to be adhered is an interior surface inside a vehicle.

11. A tamper resistant electronic tag, comprising:
a protective card;
an integrated circuit attached to the protective card;
a first substrate layer having a first side and a second side retaining a first electronic element, wherein the first side of the first substrate layer is arranged to be adhered to a surface by a first adhesive layer, whereupon the protective card is adhered to the surface; and,
a second substrate layer having a first side and a second side retaining a second electronic element operatively coupled to the first electronic element, wherein the first side of the second substrate layer is adhered to the second side of the first substrate layer by a second adhesive layer, and the second electronic element is operatively attached to the integrated circuit;
wherein the adhesion between the first substrate layer and the surface when the first substrate layer is adhered thereto is stronger than the adhesion between the protective card and the surface, and
wherein the second adhesive layer is stronger than the operative attachment between the integrated circuit and the second electronic element; and
wherein said first and second electronic elements form a passive circuit component and when said first substrate layer is attached to said surface by said first adhesive layer, an attempt to remove the tag from said surface results in at least one of: said integrated circuit becoming operatively detached from said second electronic element, or said second substrate layer becoming separated from said first substrate layer so as to damage said operative coupling between said first and second electronic elements, damaging said passive circuit component.

12. The tamper resistant electronic tag of claim 11, wherein when the protective card is removed from the surface after having been adhered thereto, the first and second substrate layers remain with the surface and the integrated circuit is removed with the protective card, thereby severing the operative attachment between the integrated circuit and the second electronic element.

13. The tamper resistant electronic tag of claim 11, wherein:
the protective card has a first side that contains a recess and the integrated circuit is located within the recess.

14. The tamper resistant electronic tag of claim 11, wherein:
the protective card contains a hole and the integrated circuit is located within the hole.

15. The tamper resistant electronic tag of claim 11, wherein:
the first substrate layer is opaque.

16. The tamper resistant electronic tag of claim 11, wherein:
the first side of the first substrate layer comprises a material on which graphics and text can be printed.

17. The tamper resistant electronic tag of claim 11, wherein:
the protective card has a first side and a second side and a label displaying information about the tag is adhered to the second side of the protective card.

18. The tamper resistant electronic tag of claim 11, wherein:
the integrated circuit is able to receive and modify a signal to incorporate information into the signal.

19. The tamper resistant electronic tag of claim 11, wherein:
the surface to which the protective card of the electronic tag is arranged to be adhered is an interior surface inside a vehicle.

20. A tamper resistant electronic tag, comprising:
a protective card;
an integrated circuit attached to the protective card;
a first substrate layer retaining a first electronic element, wherein the first substrate layer is arranged to be adhered to a surface by a first adhesive layer, and is adhered to the protective card by a second adhesive layer; and, a second substrate layer retaining a second electronic element operatively coupled to the first electronic element, wherein the second substrate layer is adhered the first substrate layer by a third adhesive layer, and the second electronic element is operatively attached to the integrated circuit;

wherein the first adhesive layer is stronger than the second adhesive layer, and the third adhesive layer is stronger than the operative attachment between the integrated circuit and the second electronic element; and wherein said first and second electronic elements form a passive circuit component and when said first substrate layer is attached to said surface by said first adhesive layer, an attempt to remove the tag from said surface results in at least one of: said integrated circuit becoming operatively detached from said second electronic element, or said second substrate layer becoming separated from said first substrate layer so as to damage said operative coupling between said first and second electronic elements, damaging said passive circuit component.

21. The tamper resistant electronic tag of claim 20, wherein when the protective card is removed from the surface after having been adhered thereto, the first and second substrate layers remain with the surface and the integrated circuit is removed with the protective card, thereby severing the operative attachment between the integrated circuit and the second electronic element.

22. The tamper resistant electronic tag of claim 20, wherein the second adhesive layer has an annular shape with an opening and the second substrate layer fits in the opening of the annular second adhesive layer.

23. The tamper resistant electronic tag of claim 20, wherein:
the protective card has first side that contains a recess and the integrated circuit is located within the recess.

24. The tamper resistant electronic tag of claim 20, wherein:
the protective card contains a hole and the integrated circuit is located within the hole.

25. The tamper resistant electronic tag of claim 20, wherein:
the first substrate layer is opaque.

26. The tamper resistant electronic tag of claim 20, wherein:
the first side of the first substrate layer comprises a material on which graphics and text can be printed.

27. The tamper resistant electronic tag of claim 20, wherein:
the protective card has a first side and a second side and a label displaying information about the tag is attached to the second side of the protective card.

28. The tamper resistant electronic tag of claim 20, wherein:
the integrated circuit is able to receive and modify a signal to incorporate information into the signal.

29. The tamper resistant electronic tag of claim 20, wherein:
wherein the surface to which the first substrate layer of the electronic tag is arranged to be adhered is an interior surface inside a vehicle.

\* \* \* \* \*